(12) United States Patent
Nishizawa et al.

(10) Patent No.: US 7,220,118 B2
(45) Date of Patent: May 22, 2007

(54) HORIZONTAL MULTI-MATERIAL MOLDING MACHINE

(75) Inventors: Makoto Nishizawa, Numazu (JP); Hideaki Kitta, Mishima (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/980,295

(22) Filed: Nov. 4, 2004

(65) Prior Publication Data
US 2005/0095311 A1 May 5, 2005

(30) Foreign Application Priority Data
Nov. 5, 2003 (JP) .............................. 2003-375886

(51) Int. Cl.
*B29C 45/06* (2006.01)
(52) U.S. Cl. ............ 425/576; 425/130; 425/136; 425/351; 425/418; 425/430
(58) Field of Classification Search ............ 425/576, 425/351, 136, 418, 430, 438, 130; *B29C 45/06*
See application file for complete search history.

(56) References Cited

U.S. PATENT DOCUMENTS

| | | | |
|---|---|---|---|
| 5,631,510 A | 5/1997 | Flaig et al. | |
| 5,817,345 A * | 10/1998 | Koch et al. | 425/130 |
| 6,179,605 B1 * | 1/2001 | Littleton et al. | 425/547 |
| 6,923,633 B2 * | 8/2005 | Rudolph et al. | 425/130 |

FOREIGN PATENT DOCUMENTS

| | | |
|---|---|---|
| DE | 19906691 A1 | 8/2000 |
| DE | 10145461 A1 | 8/2002 |
| JP | 06-055569 | 3/1994 |
| JP | 06-091688 | 4/1994 |
| JP | 10-264200 | 10/1998 |

* cited by examiner

*Primary Examiner*—Yogendra N. Gupta
*Assistant Examiner*—Maria Veronica Ewald
(74) *Attorney, Agent, or Firm*—DLA Piper US LLP

(57) ABSTRACT

A horizontal multi-material molding machine includes a rotary table having a rotation axis center in a horizontal direction, a multi-material molding metal mold mounted on the rotary table, injection plunger units disposed to advance to and retreat from the multi-material molding metal mold for injecting a molten resin into cavities of the multi-material molding metal mold, a servo motor for rotating the rotary table, and a brake mechanism mounted on the servo motor and actuated when the servo motor is stopped for maintaing the position of the rotary table.

8 Claims, 3 Drawing Sheets

HORIZONTAL MULTI-MATERIAL MOLDING MACHINE

CROSS-REFERENCE TO RELATED APPLICATIONS

This application is based upon and claims the benefit of priority from prior Japanese Patent Application No. 2003-375886, filed Nov. 5, 2003, the entire contents of which are incorporated herein by reference.

BACKGROUND OF THE INVENTION

1. Field of the Invention

The present invention relates to a horizontal multi-material molding machine in which a multi-material molding metal mold is mounted on a rotary table having a rotation axis center in a horizontal direction.

2. Description of the Related Art

Multi-material (multi-color) molding machines, which mold a composite multi-molded or multi-color-molded product using a plurality of types or a plurality of colors of resins, are known. There are a vertical rotary injection molding machine (for example, Jpn. Pat. Appln. KOKAI Publication Nos. 6-91688 and 10-264200) and a horizontal injection molding machine (for example, Jpn. Pat. Appln. KOKAI Publication No. 6-55569) as these multi-material molding machines.

In the vertical rotary injection molding machine, a stationary metal mold composed of a plurality of injection molding metal molds is fixed on a stationary die, a movable metal mold is fixed on a rotary table, and the movable metal mold is alternately confronted with the stationary metal mold by the rotation of the rotary table. The vertical rotary injection molding machine is arranged such that the rotary table has a rotation axis center in a vertical direction and is rotated in a horizontal plane.

A drive source of the vertical rotary injection molding machine is a servo motor which stops when the rotary table reaches a set rotation angle by an encoder and a control unit, thereby the rotary table is stopped at a predetermined position.

In the horizontal injection molding machine, two injection devices are disposed on the upper surface of a rotary table in directions 180° apart from each other, the rotary table is rotated by a rotation mechanism, and molding is executed by alternately moving the two injection devices to an injecting position. The horizontal injection molding machine is also arranged such that the rotary table has a rotation axis center in a vertical direction and the rotary table is rotated in a horizontal plane.

A drive source of the horizontal injection molding machine is a hydraulic motor, and a pin as a positioning mechanism is inserted into a pin hole of the rotary table, thereby the rotary table is kept at a stop position.

Each of the vertical rotary injection molding machine and the horizontal injection molding machine described above is arranged such that the rotation axis center of the rotary table extends in the vertical direction and the rotary table is rotated in the horizontal plane. Accordingly, when the rotary table is stopped because the drive source stops, the rotary table is kept at the stop position.

In contrast, there is used a horizontal injection molding machine having a rotation axis center in a horizontal direction. In this horizontal injection molding machine, a metal mold mounting surface of a rotary table is formed in a vertical direction. Moreover, since a heavy injection molding metal mold is fixed on the metal mold mounting surface of the rotary table, when a motor which rotates the rotary table stops or is stopped by power failure and the like, the motor becomes free to rotate, from which a problem arises in that the rotary table is rotated by gravity.

BRIEF SUMMARY OF THE INVENTION

An object of the present invention is to provide a horizontal multi-material molding machine arranged such that even if a motor that drives a rotary table having a rotation axis center in a horizontal direction is stopped, the rotary table is not needlessly rotated and is kept at a stop position.

To achieve the above object, a horizontal multi-material molding machine of the present invention includes a rotary table having a rotation axis center in a horizontal direction, a multi-material molding metal mold mounted on the rotary table, injection plunger units disposed to advance to and retreat from the multi-material molding metal mold for injecting a molten resin into a cavity of the multi-material molding metal mold, a motor for rotating the rotary table, and a brake mechanism mounted on the motor and actuated when the motor stops for maintaing the position of the rotary table.

According to the present invention, even if the metal mold mounting surface of the rotary table extends in a vertical direction and a heavy injecting molding metal mold is mounted on the rotary table, when the motor for driving the rotary table is stopped, the stop position of the rotary table can be maintaing by the brake mechanism.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained below based on the figures.

Figure 1:
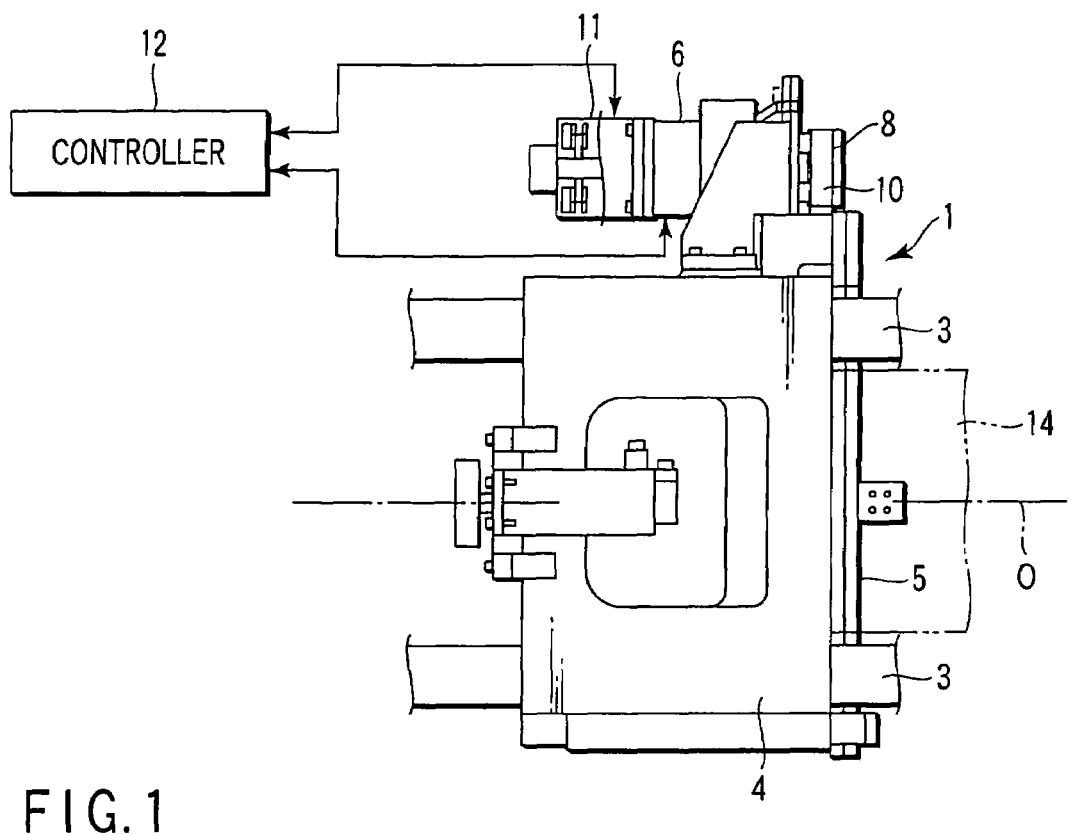
FIG. 1 is a side elevational view showing a drive unit of a horizontal multi-material molding machine according to a first embodiment of the present invention.
Figure 2:
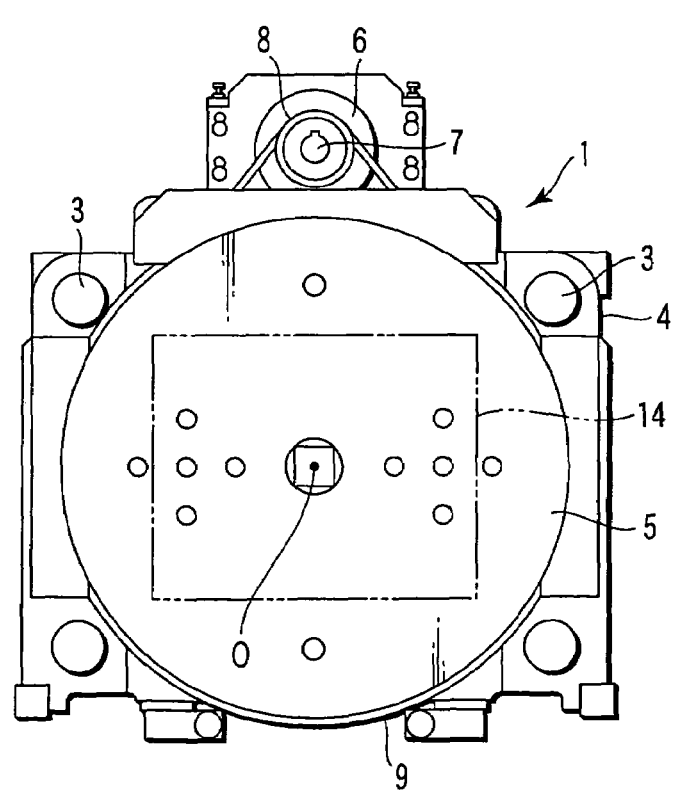
FIG. 2 is a front elevational view showing the drive unit.
Figure 3:
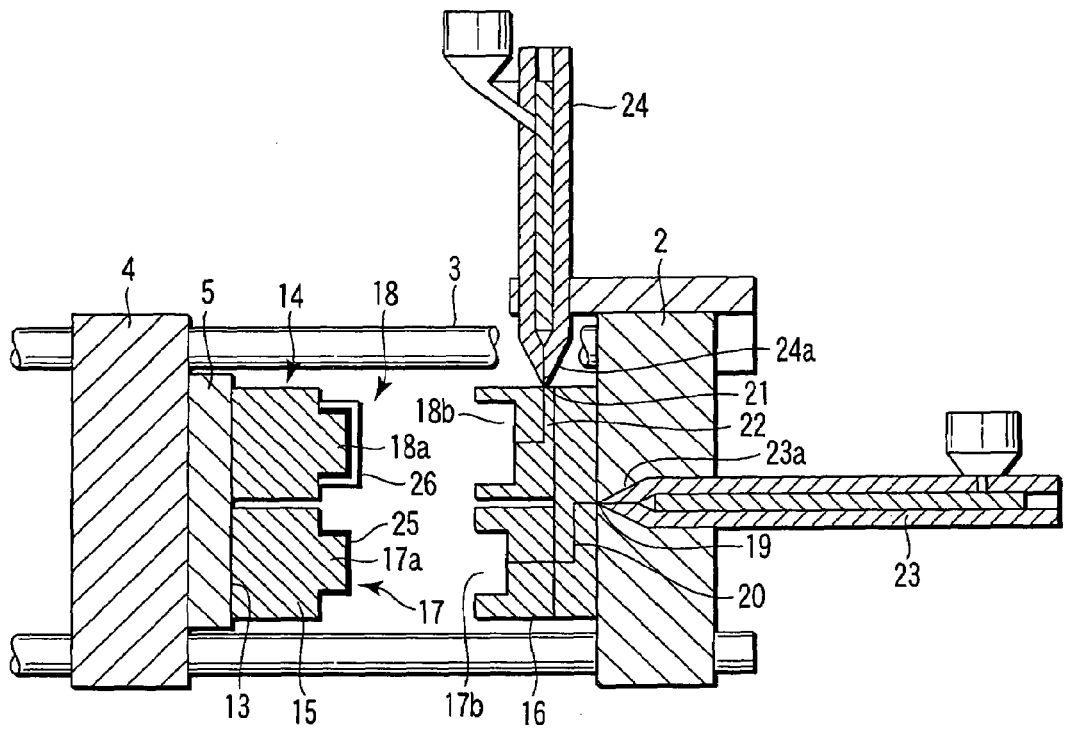
FIG. 3 is a longitudinal sectional view showing a molding unit of a multi-material molding metal mold assembled in the horizontal multi-material molding machine.
Figures 4A, 4B, 4C:
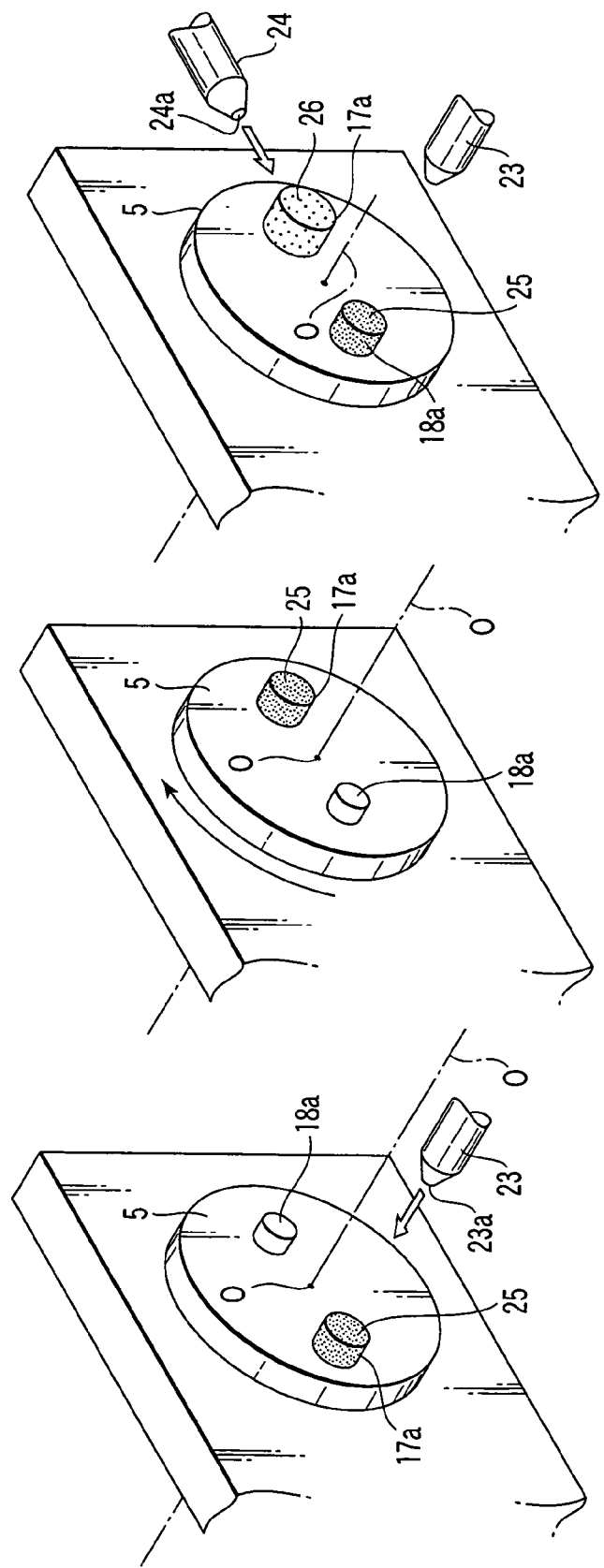
FIGS. 4A to 4C are perspective views showing molding processes of a molded product molded by the horizontal multi-material molding machine.

FIG. 1 is a side elevational view showing a drive unit of a horizontal multi-material molding machine according to a first embodiment of the present invention, FIG. 2 is a front elevational view showing the drive unit, FIG. 3 is a longitudinal sectional view showing a molding unit of a multi-material molding metal mold assembled in the horizontal multi-material molding machine, and FIGS. 4A to 4C are perspective views showing molding processes of a molded product molded by the horizontal multi-material molding machine.

As shown in FIGS. 1 to 3, the horizontal multi-material molding machine 1 includes a stationary die plate 2 to which a plurality of tie bars 3 are fixed in a horizontal direction, and a movable die plate 4 is movably supported by the tie bars 3 in a horizontal direction.

A rotary table 5 having a rotation axis center O in a horizontal direction is rotatably disposed to the movable die plate 4. The movable die plate 4 is provided with a servo motor 6 as a motor, and a drive pulley 8 is mounted on a rotary shaft 7 of the servo motor 6. The rotary table 5 includes a driven pulley 9 about the rotation axis center O, and a belt 10 is stretched between the drive pulley 8 and the driven pulley 9. The rotary table 5 is driven by the servo motor 6.

A brake mechanism 11 is directly coupled with the rotary shaft 7 of the servo motor 6. The brake mechanism 11 is an electric brake, and when the servo motor 6 stops, a signal of the servo motor 6 is input to the brake mechanism 11 through a controller 12. Then, the brake mechanism 11 is actuated to thereby lock the rotary shaft 7 of the servo motor 6. Accordingly, when the servo motor 6 stops or is stopped by power failure and the like, the brake mechanism 11 is automatically actuated so that the rotary table 5 is kept at the stop position. Further, when the servo motor 6 is energized, a signal indicating it is input to the brake mechanism 11 through the controller 12 so that the brake of the brake mechanism 11 is released.

A movable metal mold 15 of a multi-material molding metal mold 14 is mounted on a metal mold mounting surface 13 on the front surface of the rotary table 5. A stationary metal mold 16 of the multi-material molding metal mold 14 is fixed to the stationary die plate 2, and the movable metal mold 15 is advanced to and retreated from the stationary metal mold 16 by moving the movable die plate 4.

A first cavity 17 and a second cavity 18 are disposed symmetrically between the stationary metal mold 16 and the movable metal mold 15 about the rotation axis center O. Projections 17a and 18a on the movable metal mold 15 side have the same shape and the same dimensions, the projections 17a and 18a constituting the first and second cavities 17 and 18 and formed in, for example, a columnar shape. Recesses 17b and 18b on the stationary metal mold 16 side also have the same shape, the recesses 17b and 18b constituting the first and second cavities 17 and 18 and formed in, for example, a cylindrical shape. However, the recess 18b on the second cavity 18 side has an inside diameter and depth larger than those of the recess 17b on the first cavity side 17 to secure a resin filling space in a secondary molding.

Further, a first nozzle touch portion 19 is disposed to an end surface of the stationary metal mold 16 and communicates with a first resin passage 20 communicating with the recess 17b of the first cavity 17. A second nozzle touch portion 21 is disposed to a side surface of the stationary metal mold 16 and communicates with a second resin passage 22 communicating with the recess 18b of the second cavity 18.

A first injection plunger unit 23, which injects, for example, a black molten resin, is disposed to the first nozzle touch portion 19 communicating with the first cavity 17 in confrontation therewith. Further, a second injection plunger unit 24, which injects, for example, a red molten resin, is disposed to the second nozzle touch portion 21 communicating with the second cavity 18 in confrontation therewith. The above arrangement constitutes a twin orthogonal injection apparatus having the first and second injection plunger units 23 and 24 whose injecting directions are set orthogonally.

Next, an operation of the first embodiment will be explained. When the movable die plate 4 is advanced to the stationary die plate 2, the movable metal mold 15 is connected to the stationary metal mold 16 of the multi-material molding metal mold 14, and the movable metal mold 15 is clamped to the stationary metal mold 16, the first cavity 17 and the second cavity 18 are formed.

When an injection nozzle 23a is connected to the first nozzle touch portion 19 by advancing the first injection plunger unit 23 in this state and the black molten resin is injected from the injection nozzle 23a, the first cavity 17 is filled with the black molten resin through the first resin passage 20. When the movable die plate 4 is retracted along the tie bars 3 after the black molten resin filled in the first cavity 17 is cooled and solidified, the movable metal mold 15 is separated from the stationary metal mold 16. With this operation, a black primary molded product 25 can be obtained on the projection 17a of the first cavity 17 as shown in FIG. 4A.

Next, when the servo motor 6 is driven, the drive pulley 8 is rotated through the rotary shaft 7, the rotation of the drive pulley 8 is transmitted to the driven pulley 9 through the belt 10, and the rotary table 5 is rotated 180°. When the rotary table 5 is rotated 180°, the projection 17a of the first cavity 17 and the primary molded product 25 are moved rightward as shown in FIG. 4B, the projection 18a of the second cavity 18 is moved leftward, and the servo motor 6 stops. When the servo motor 6 stops, a signal of the servo motor 6 is input to the brake mechanism 11 through the controller 12. Then, the brake mechanism 11 is actuated and maintains the position of the rotary shaft 7 of the servo motor 6. Accordingly, the rotary table 5 is not needlessly rotated and kept at its stop position.

Next, when the movable die plate 4 is advanced to the stationary die plate 2, the movable metal mold 15 is connected to the stationary metal mold 16 of the multi-material molding metal mold 14, and the movable metal mold 15 is clamped to the stationary metal mold 16, the first cavity 17 and the second cavity 18 are formed. At the time, since the primary molded product 25 is fixed to the projection 17a of the first cavity 17, the primary molded product 25 is accommodated in the recess 18b of the stationary metal mold 16, and further a resin filling space is secured around the outer periphery of the primary molded product 25.

When an injection nozzle 24a is connected to the second nozzle touch portion 21 by advancing the second injection plunger unit 24 in this state and the red molten resin is injected, the resin filling space around the outer periphery of the primary molded product 25 is filled with the red molten resin through the second resin passage 22. When the movable die plate 4 is retracted along the tie bars 3 after the red molten resin filled in the resin filling space around the outer periphery of the primary molded product 25 has cooled and solidified, the movable metal mold 15 is separated from the stationary metal mold 16 through the rotary table 5. Then, as shown in FIG. 4C, a secondary molded product 26 composed of the primary molded product 25, which is kept on the projection 17a of the first cavity 17 and covered with the red resin, can be obtained.

Note that the second cavity 18 moves leftward and is filled with the black molten resin by the first injection plunger unit 23 while the outside space of the primary molded product 25 is being filled with the red molten resin by the second injection plunger unit 24 after the the first cavity 17 is moved rightward, thereby two-color molding can be continuously executed and productivity can be improved.

In the multi-material molding process described above, even if the servo motor 6 is stopped by, for example, power failure, a signal of the servo motor 6 is input to the brake mechanism 11 through the controller 12 at the time the servo motor 6 is stopped. Then, the brake mechanism 11 is actuated and maintains the position of the rotary shaft 7 of the servo motor 6.

Figure 5:
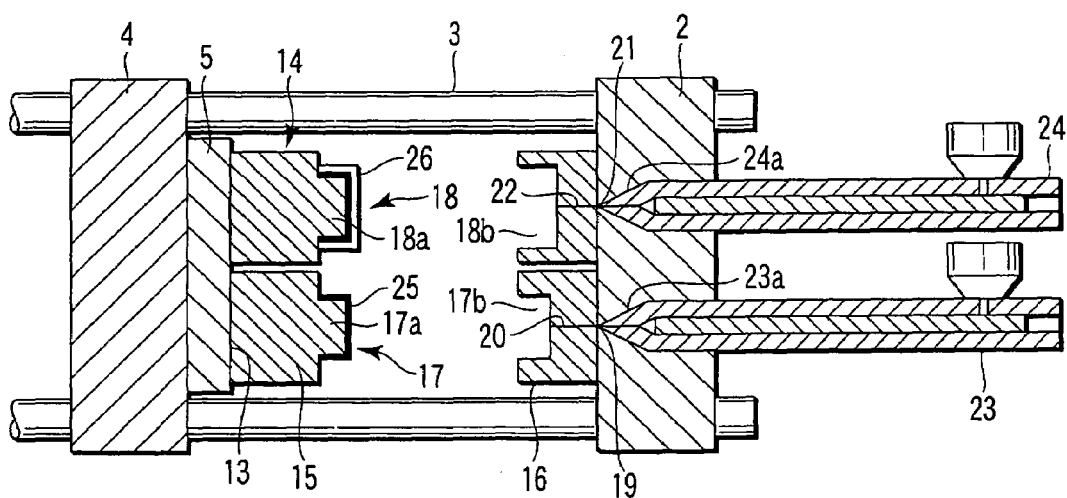
FIG. 5 is a longitudinal sectional view showing a molding unit of a multi-material molding metal mold assembled in a horizontal multi-material molding machine according to a second embodiment of the present invention.

Note that, the twin orthogonal injection apparatus having the first and second injection plunger units 23 and 24 whose injecting directions are set orthogonally has been described in the above embodiment. However, as shown in FIG. 5, the two-color molding can be continuously executed even in a twin parallel injection apparatus having first and second injection plunger units 23 and 24 whose injecting directions are set parallel to each other.

Further, the case that the injection molding metal mold is provided with the two cavities and the two-color molding is executed by rotating the rotary table 180° has been explained in the above embodiment. However, the injection molding metal mold may be provided with three or four cavities and a molding operation may be executed by rotating the rotary table 120° or 90°, thereby it is possible to execute three-color molding or four-color molding.

Further, in the above embodiment, the first cavity 17 and the second cavity 18 are disposed symmetrically about the rotation axis center O between the stationary metal mold 16 and the movable metal mold 15 of the one set of the multi-material molding metal mold 14. However, a plurality of multi-material molding metal molds 14, for example, a pair of multi-material molding metal molds 14, may be disposed across the rotation axis center O of the rotary table 5.

Then, nozzle touch portions communicating with the cavities of the respective multi-material molding metal molds 14 may be provided so that the different injection plunger units 23 and 24 are alternately confronted with the nozzle touch portions by the rotation of the rotary table 5.

It should be noted that the present invention is by no means limited to the above embodiments as they are and can be embodied by modifying the components of the embodiments within a range which does not depart from the gist of the present invention. Further, various inventions can be created by appropriately combining a plurality of components disclosed in the embodiments. For example, some components may be omitted from all the components disclosed in the embodiments. Further, the components of the different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A horizontal multi-material molding machine comprising:
    a rotary table having a rotation axis center in a horizontal direction;
    a stationary die plate located opposite to the rotary table;
    a multi-material molding metal mold including a movable metal mold and a stationary metal mold, the movable metal mold being mounted on the rotary table to form a plurality of cavities, the stationary metal mold being fixed to the stationary die plate, and being located opposite to the movable metal mold, to form the plurality of cavities;
    a movable die plate supporting the movable metal mold;
    a plurality of injection plunger units disposed to advance to and retreat from the stationary metal mold to inject molten resins into the plurality of cavities;
    a motor configured to rotate the rotary table and to position the movable metal mold with respect to the stationary metal mold, the motor being located in the vicinity of the movable die plate to transmit a rotation force to the rotary table through a drive pulley and a driven pulley, the drive pulley being provided on a rotary shaft of the motor, the driven pulley being provided on the rotary table; and
    a brake mechanism mounted on the motor,
    wherein the brake mechanism is configured to be actuated when the motor is stopped to maintain the position of the rotary table.

2. A horizontal multi-material molding machine according to claim 1, wherein the motor is a servo motor, and the brake mechanism is directly coupled with the rotary shaft of the servo motor.

3. A horizontal multi-material molding machine according to claim 1, wherein the multi-material molding metal mold has a plurality of cavities across the rotation axial center of the rotary table, each of the cavities has a nozzle touch portion connected to a nozzle of each of the injection plunger units, and the nozzle touch portion is alternately confronted with a different injection plunger unit by the rotation of the rotary table.

4. A horizontal multi-material molding machine according to claim 1, wherein the multi-material molding metal mold comprises a plurality of multi-material molding metal molds disposed across the rotation axis center of the rotary table, each of the multi-material molding metal molds has nozzle touch portions communicating with cavities, and the nozzle touch portions are alternately confronted with a different injection plunger unit by the rotation of the rotary table.

5. A horizontal multi-material molding machine comprising:
    a rotary table having a rotation axis center in a horizontal direction;
    a stationary die plate located opposite to the rotary table;
    a plurality of movable molds mounted to the rotary table;
    a plurality of stationary molds mounted to the stationary die plate, the plurality of stationary molds being disposed opposite to the plurality of movable molds, the plurality of movable molds and the plurality of stationary molds being movable relative to each other to form a plurality of cavities;
    a movable die plate supporting the plurality of movable molds;
    a plurality of injection plunger units disposed to advance to and retreat from the stationary die plate to inject molten resins through the plurality of stationary molds into the plurality of cavities;

a motor configured to rotate the rotary table to position each of the plurality of movable molds with respect to a respective one of the plurality of stationary molds, the motor being located in the vicinity of the movable die plate to transmit a rotation force to the rotary table through a drive pulley and a driven pulley, the drive pulley being provided on a rotary shaft of the motor, the driven pulley being provided on the rotary table; and a brake mechanism mounted on the motor, wherein the brake mechanism is configured to be actuated when the motor is stopped to maintain the position of the rotary table.

6. The horizontal multi-material molding machine according to claim 5, wherein the motor is a servo motor, and the brake mechanism is directly coupled with the rotary shaft of the servo motor.

7. The horizontal multi-material molding machine according to claim 5, wherein each of the plurality of cavities has a nozzle touch portion connected to a nozzle of each of the injection plunger units, and the nozzle touch portion is alternately confronted with a different injection plunger unit in the plurality of injection plunger units when the rotary table is rotated.

8. The horizontal multi-material molding machine according to claim 5, wherein each of the stationary molds has a nozzle touch portion communicating with a respective cavity in the plurality of cavities, and the nozzle touch portion is alternately confronted with a different injection plunger unit in the plurality of injections plunger units when the rotary table is rotated.

* * * * *